(12) United States Patent
Aguiling et al.

(10) Patent No.: US 8,854,662 B1
(45) Date of Patent: Oct. 7, 2014

(54) PRINT MANAGEMENT SYSTEM AND METHOD FOR FACILITATING PRINT JOB MANAGEMENT AND MONITORING MULTIPLE GEOGRAPHICALLY DISPERSED PRINTERS

(75) Inventors: Michael Aguiling, Tappan, NY (US);
Michael Borress, Old Bridge, NJ (US);
Jonathan Baum, Brooklyn, NY (US);
Ayan Bandopadhyay, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 207 days.

(21) Appl. No.: 13/273,274

(22) Filed: Oct. 14, 2011

Related U.S. Application Data

(60) Provisional application No. 61/393,466, filed on Oct. 15, 2010.

(51) Int. Cl.
*G06F 3/12* (2006.01)

(52) U.S. Cl.
USPC ..................................... 358/1.15; 358/1.13

(58) Field of Classification Search
USPC .............................................. 358/1.13, 1.15
See application file for complete search history.

(56) References Cited

U.S. PATENT DOCUMENTS

| | | | |
|---|---|---|---|
| 4,789,147 A | 12/1988 | Berger et al. | |
| 5,644,685 A | 7/1997 | Baehr | |
| 5,710,635 A | 1/1998 | Webster et al. | |
| 5,960,164 A | 9/1999 | Dorfman et al. | |
| 5,995,721 A | 11/1999 | Rourke et al. | |
| 6,104,498 A | 8/2000 | Shima et al. | |
| 6,249,716 B1 | 6/2001 | Edens et al. | |
| 6,256,104 B1 | 7/2001 | Rumph et al. | |
| 6,606,165 B1 | 8/2003 | Barry et al. | |
| 6,707,563 B1 | 3/2004 | Barry et al. | |
| 6,995,853 B1 | 2/2006 | Bratsanos et al. | |
| 7,925,705 B2 * | 4/2011 | Ishimoto et al. | 709/206 |
| 8,264,726 B2 | 9/2012 | Klassen et al. | |
| 8,289,538 B2 | 10/2012 | Cyman, Jr. et al. | |
| 8,300,250 B2 | 10/2012 | Chabrol et al. | |
| 8,340,813 B2 | 12/2012 | Brown | |
| 8,351,063 B2 | 1/2013 | Chabrol et al. | |
| 8,427,670 B2 | 4/2013 | Rai | |

(Continued)

FOREIGN PATENT DOCUMENTS

| | | |
|---|---|---|
| EP | 1644799 A2 | 4/2006 |
| EP | 1953705 | 8/2008 |
| WO | WO-0193057 | 12/2001 |

*Primary Examiner* — Qian Yang
(74) *Attorney, Agent, or Firm* — Goodwin Procter, LLP

(57) ABSTRACT

Embodiments of the invention include a computer-implemented control and monitoring method and system for print shop management. The method may include monitoring multiple print servers and insertion devices for inserting printed material into envelopes. Programmed computer processing components may be used for performing steps including receiving print status data and insertion status data from multiple printing and insertion sites, and matching the print data with the insertion data for each submitted print job and integrating the print status data with the insertion data. The method additionally includes providing a user application including multiple user interfaces displaying the integrated print status data and insertion status data in an interactive format.

17 Claims, 13 Drawing Sheets

(56) References Cited

U.S. PATENT DOCUMENTS

| | | |
|---|---|---|
| 8,446,607 B2 | 5/2013 | Zucker et al. |
| 2004/0064762 A1* | 4/2004 | Deshpande et al. ............ 714/44 |
| 2007/0024896 A1* | 2/2007 | Bounar ........................ 358/1.15 |
| 2009/0040563 A1 | 2/2009 | Mestha et al. |
| 2009/0244620 A1* | 10/2009 | Takahashi et al. ........... 358/1.15 |
| 2010/0245885 A1* | 9/2010 | Selvaraj ....................... 358/1.15 |
| 2012/0320408 A1 | 12/2012 | Evevsky |
| 2013/0002237 A1 | 1/2013 | Jessen et al. |

* cited by examiner

| Supplies Alerts | | Advisory Alerts | | Media Path Alerts |
|---|---|---|---|---|
| Order fuser | | Configure media | | Output bin full |
| Order transfer kit | | Out of memory | | Paper jam |
| Order clean kit | | Manual feed needed | | Cover open |
| Order drum | | Threshold page count | | High capacity input error |
| Perform printer maintenance | | | | Stapler error |
| Replace fuser | | Service Errors | | Envelope feeder error |
| Replace transfer kit | | 4x.x errors | | |
| Replace clean kit | | 5x.x errors | | Service Alerts |
| Replace drum | | 6x.x errors | | Offline |
| Stapler low on staples | | 7x.x errors | | Printer error |
| Load front stapler | | 8x.x errors | | Intervention needed |
| Load rear stapler | | Duplexer errors | | Carriage stalled |
| Non-HPsupply installed | | Fuser errors | | Lamp faulty |
| Order doc. feeder kit | | Fan errors | | Lamp life warning |
| Replace doc. feeder kit | | Drum / finisher errors | | Lamp problem |
| Order maint. kit | | Disk errors | | Internal temp too high |
| Replace maint. kit | | Input / output errors | | Lamplife over |
| Media out | | | | Fan problem |
| Media low | | | | Color wheel problem |
| Ink error | | | | Lamp cover problem |
| Incorrect pen installed | | | | |
| Pen faulty | | | | |
| Cyan pen expired | | | | |
| Magenta pen expired | | | | |
| Yellow pen expired | | | | |
| Black pen expired | | | | |
| Cyan low ink | | | | |
| Magenta low ink | | | | |
| Yellow low ink | | | | |
| Black low ink | | | | |
| Toner out (replace cart.) | | | | |
| Toner low (order cart.) | | | | |
| Order cart. at threshold | | | | |

1310 — Supplies Alerts; 1320 — Advisory Alerts; 1330 — Service Errors; 1340 — Media Path Alerts; 1350 — Service Alerts

*Not all alerts are available for all printer models

FIG 13

PRINT MANAGEMENT SYSTEM AND METHOD FOR FACILITATING PRINT JOB MANAGEMENT AND MONITORING MULTIPLE GEOGRAPHICALLY DISPERSED PRINTERS

RELATED APPLICATIONS

This application hereby incorporates by reference and claims priority from U.S. Provisional Application Ser. No. 61/393,466 filed on Oct. 15, 2010.

TECHNICAL FIELD

Embodiments of the invention are related generally to systems and methods for print shop management and in particular to automated processing and monitoring through the use of a dashboard providing collected data from multiple processes for monitoring and manipulation.

BACKGROUND OF THE INVENTION

Corporations often process and send printed materials to customers and potential customers. Management of the creation and distribution of the printed materials requires oversight of: (1) the print cycle; and (2) insertion of printed materials into envelopes. In current management systems, these two processes as separately managed and do not communicate with one another. Furthermore, the monitoring of each of the processes is entirely manual so that the status is normally determined by an employee viewing the printing machines and the insertion process.

Currently, status updates may take the form of printed reports or writing results on white boards. An employee may use a white board to record current printing status and make periodic updates. These white boards are typically updated periodically during the day, for example, three times daily.

In order to consolidate information, a whiteboard and/or report for the print cycle and a white board and/or report for insertion may be periodically recorded and compared. For example, for the print cycle, the data is often loaded into a spreadsheet and may ultimately be incorporated in a paper report through the use of an automated document factory (ADF) workflow. However, the information collected by the ADF during the pint cycle does not provide visibility into the insertion location. The ADF knows which jobs are at the insertion location, but cannot report on the progress of each job. Thus, a manager of the printing process has no insight into progress of the insertion process and vice versa.

Thus, a system is needed that provides insight into both insertion and printing processes for viewing and usage by print shop management. Such a system should facilitate collection of information from both workflow processes and compilation of the collected information in a configuration useful for management. Furthermore, the system should enable real time updates to create an opportunity for efficient management.

SUMMARY OF THE INVENTION

In one aspect of the invention, a computer-implemented control and monitoring method is provided for print shop management. The method includes monitoring multiple print servers and insertion devices for inserting printed material into envelopes. Programmed computer processing components perform multiple steps including receiving print status data and insertion status data from multiple printing and insertion sites. The steps further include matching the print data with the insertion data for each submitted print job, integrating the print status data with the insertion data, and providing a user application including multiple selectable user interfaces displaying the integrated print status data and insertion status data in an interactive format.

In another aspect of the invention, a computer-implemented control and monitoring system is provided for facilitating print job management. The system monitors at least one print server and at least one insertion device for inserting printed material into envelopes and includes a print data collection processor communicating with the at least one print server, the print data collection processor implementing a data collection process for collecting print status data. The system additionally includes insertion data collection processing components communicating with the at least one insertion device for collecting insertion status data and data integration components for automatically integrating the collected insertion status data with the collected print status data. The system further includes a user application including multiple user interfaces for displaying the integrated print status data and insertion status data in an interactive format.

In a further aspect of the invention, a computer-implemented control and monitoring method for print shop management is provided, the method monitoring at least one print server and at least one insertion device for inserting printed material into envelopes. The method includes implementing programmed computer processing components for performing multiple steps including communicating with the at least one print server for collecting print status data, communicating with the at least one insertion device for collecting insertion status data, and automatically integrating the collected insertion status data with the collected print status data. The method also provides a user application for including multiple user interfaces for displaying the integrated print status data and insertion status data in an interactive format.

BRIEF DESCRIPTION OF THE DRAWINGS

The present invention is described in detail below with reference to the attached drawings figures, wherein:

FIG. 7 is a user interface illustrating a product view within a statement processing dashboard in accordance with an embodiment of the invention;

FIG. 11 is a user interface illustrating a printer monitoring view within a print dashboard in accordance with an embodiment of the invention; FIG. 13 is a chart illustrating alerts available through user interfaces in accordance with an embodiment of the invention.

DETAILED DESCRIPTION OF PREFERRED EMBODIMENTS

Embodiments of the present invention are directed to a system and method for process flow management for printing services. The system and method incorporate a user interface dashboard system that depicts collected real time data for user viewing and manipulation. Embodiments of the invention extract data from various print jobs and combine the collected print job data with data from envelope insertions and provide an end to end process flow management system that may be accessible over the Internet. The system may additionally include or be integrated with cameras at the printing and/or insertion sites so that a person viewing the dashboard remotely could have a real time view of the printing and insertion processes.

Figure 1:
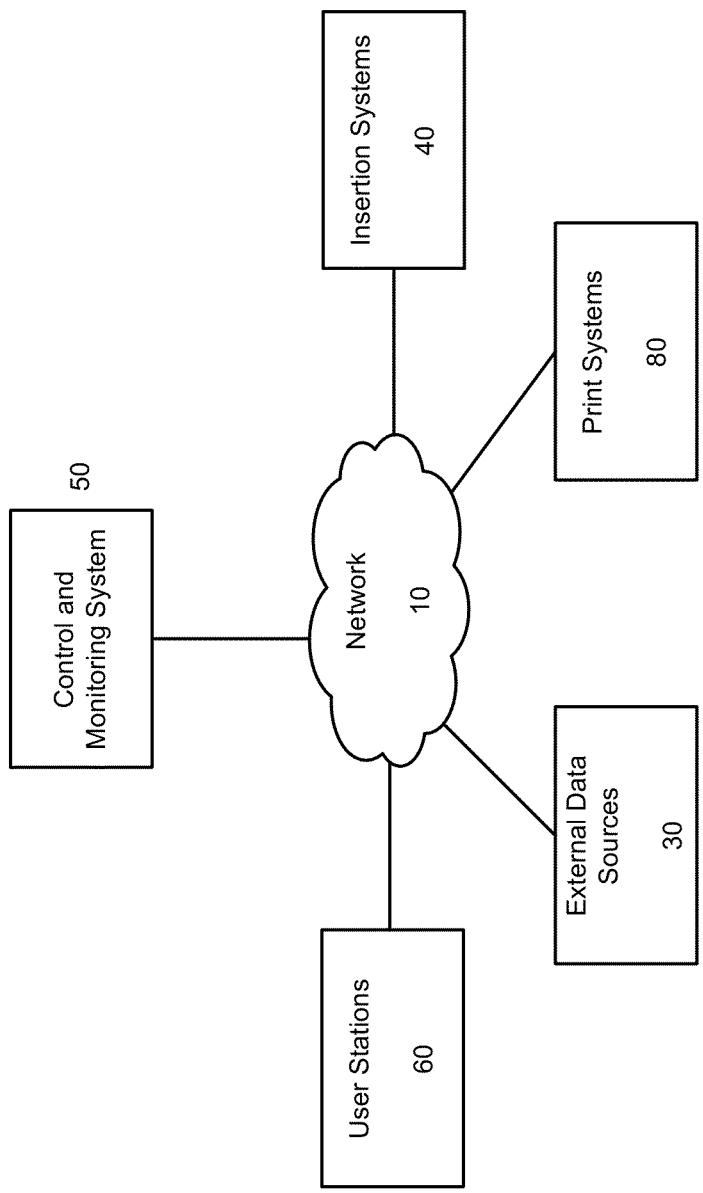
FIG. 1 is a block diagram illustrating an operating environment for a control and monitoring system in accordance with an embodiment of the invention.

FIG. 1 is a block diagram illustrating an operating environment for a control and monitoring system in accordance with an embodiment of the invention External data sources 20, print systems 30, insertion systems 40, control and monitoring system 50, and user stations 60 may be connected over a network 10.

The network 10 may be or include any known network. Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. Although the components are shown to be connected over network 130, the components may be connected directly or over multiple networks. Alternatively, some components may be combined so as to be integral with one another.

The external data sources 20 may include data warehouses, databases, and other external sources. The sources may include equipment manufacturers information, print information, inserter information, and useful information that is available internally or externally to the organization. A configuration management database (CMDB) may be provided to include a repository of information related to all the components of the system including the IT infrastructure.

The print system 30 could include one printer and one and one inserter. However, embodiments of the invention are best adapted for and most useful in situations where the print system 30 includes multiple printers at multiple geographic locations across the United States and/or across the world. The printers may include multiple different brands and models of printers.

The insertion systems 40 are provided on a scale to accommodate the print systems 30. The insertion systems 40 are provided in order to insert printed materials into envelopes for mailing and/or delivery to their final destinations.

The control and monitoring system 50 serves to control and integrate the functions of the print system 30 and the insertion system 40. As will be described in greater detail below, the control and monitoring system 50 integrates collected data and provides a user application that enables viewing of multiple user interfaces that provide status data pertaining to the print and insertion systems 30 and 40.

The user stations 60 may be provided to enable viewing of the collected integrated data by managers and other print personnel. The viewing may occur on any type of computing device or screen receiving data from a processing machine or computing device, as will further be described below. Various user interfaces created through the control and monitoring system 50 enable simplified access to information at the multiple printing and insertion sites.

Figure 2:
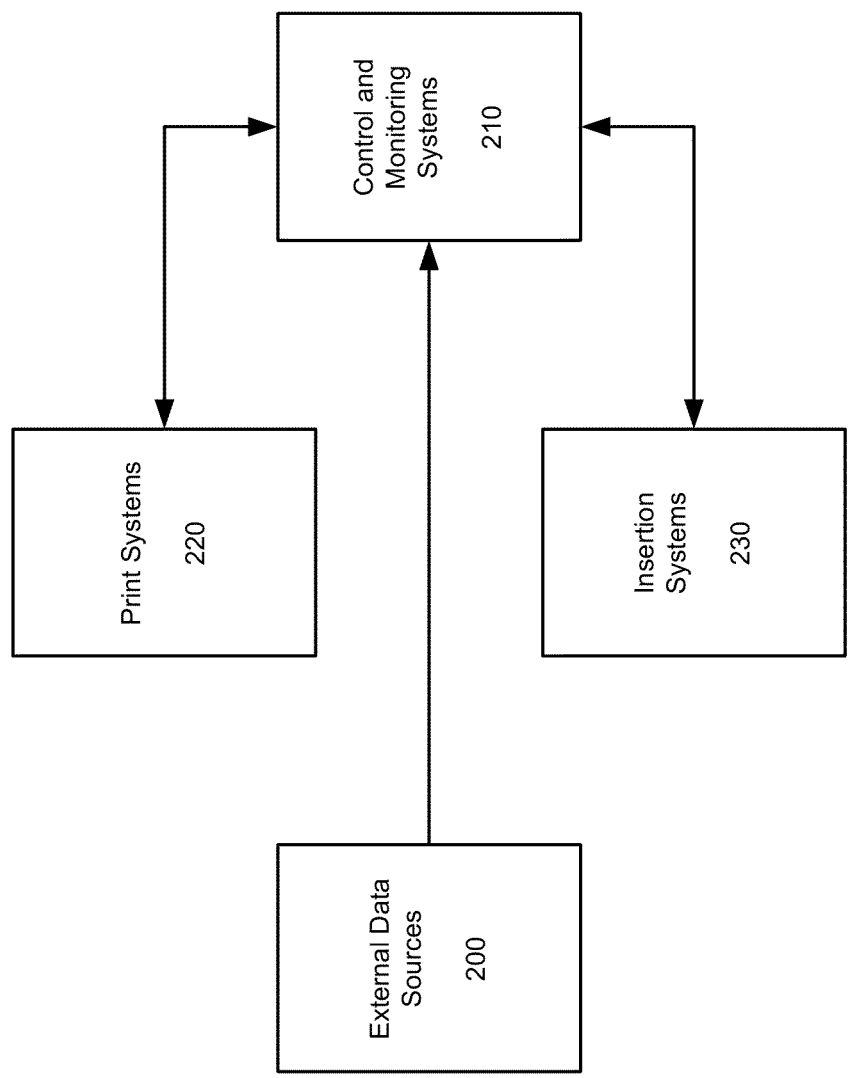
FIG. 2 is a block diagram illustrating workflow in accordance with an embodiment of the invention.

FIG. 2 is a block diagram illustrating workflow in accordance with an embodiment of the invention. External data sources 200 provide information to control and monitoring system 210. The control and monitoring system 210 controls and monitors print systems 220 and insertion systems 230. An embodiment of the components of the control and monitoring system 210 is illustrated in FIG. 3.

Figure 3:
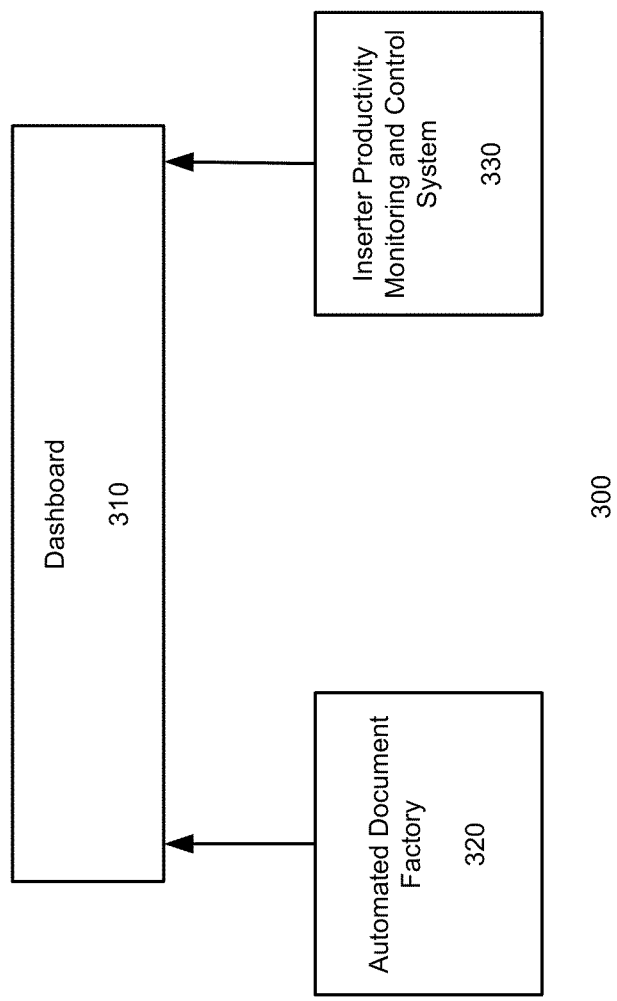
FIG. 3 is a block diagram illustrating a workflow method in a control and monitoring system in accordance with an embodiment of the invention.

FIG. 3 is a block diagram illustrating a workflow method in a control and monitoring system in accordance with an embodiment of the invention. The control and monitoring system shown in FIG. 3 may include an ADF 320 and an inserter productivity monitoring and control system 330. In operation, the ADF 320 and the inserter productivity monitoring and control system 330 provide real time updates to the dashboard system 310 for integration and display. Although the components of the control and monitoring system are shown as directly communicating with one another, they may be connected with each other over one or more networks.

The above-described components may be located in the same or different locations. They may collect the aforementioned data and send it over one or more networks to a remote location for integration and creation of user interfaces.

In operation, data from the printing systems and insertion systems may be collected and transmitted to the control and monitoring system by various mechanisms including video cameras installed at the respective sites. Data may also be collected by computing systems or on site personnel. As further explained below, the ADF 320 operates to transfer printed material from printing to insertion processes. The ADF 320 and inserter productivity monitoring and control system 330 may include computer hardware and software configured to process the data collected from the printing system and insertion systems. The ADF 320 and inserter productivity monitoring system 330 may further include or interface with one or more databases for managing collected data. The dashboard system 330 may integrated the collected status data provide the data in the form of selectable user interfaces as will be further described with reference to FIGS. 5-13.

Figure 4:
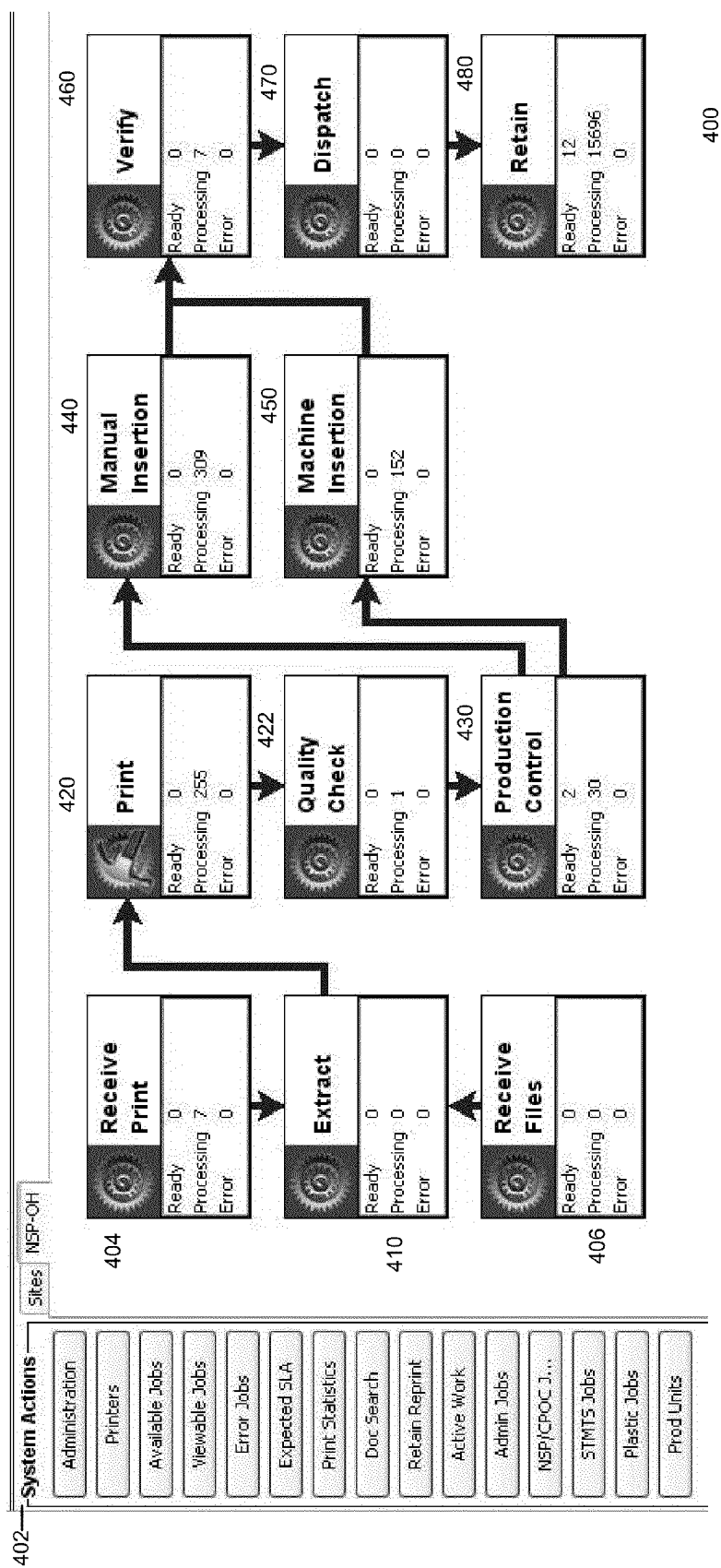
FIG. 4 is a block diagram illustrating a workflow method within an ADF of the control and monitoring system in accordance with an embodiment of the invention.

FIG. 4 is a block diagram illustrating a user interface 400 showing a workflow method within the ADF of the control and monitoring system in accordance with an embodiment of the invention. The ADF is an architecture that addresses the unique problems encountered in high volume document production environments especially but not limited to printing and mailing operations. Enterprises use the ADF architecture to provide the foundation for document production operations, such as transaction printing (bills, checks, policies, etc.) and/or marketing collateral (brochures, literature, etc.). Hardware and software technology providers use the ADF architecture to frame the products and features they offer to the print operations The modules of the ADF are tied together with interfaces that ensure that the outputs of a preceding module match the input requirements for the next module.

Available system actions achievable through the user interface are shown at 402. Processes executed by the ADF and the status of each process are shown adjacent the system actions. Process 404 and Process 406 are Receive Print and Receive Files processes respectively. Process 404 may be for the advanced function printing (AFP) and process 406 may be for the control files that match to the AFP. AFP is a family of associated printer software and hardware that provides document and information presentation control independent of specific applications and devices. Using AFP, users can control formatting, the form of paper output, whether a document is to be printed or viewed online, and manage document storage and access in a distributed network across multiple operating system platforms. AFP is primarily used in large enterprises with printer rooms and expensive high-speed printers. AFP applications allow users or print room operators to distributed print jobs among a group of printers and to designate backup printers when one fails.

Process 404 examines the AFP, indexes it, and loads data about the jobs and mail pieces into an ADF database and performs transforms if necessary. Such data may include, for example, the name of the job, the number of pages, line of business or other data? Process 406 examines the control files and also loads the ADF database. Once the control file information is loaded, Process 404 may compare the AFP to the control files to match them together. Once this is done the jobs move forward in their respective processes until all data is loaded into the ADF database and the jobs are ready to be prepared for printing.

Process 410 is an extract process that prepares jobs for printing. Process 410 thresholds the print files received into manageable production sizes for the current configuration of the production floor to release the work to the print queue. For example, if the floor equipment best supports jobs of the size of 18-22,000 sheets, a stream of 200,000 sheets may be thresholded at 20,000 sheets such that 10 child jobs are created. The child jobs may include the thresholded AFP and the control file. The ADF updates the ADF database allocating each of he already indexed mail pieces into the appropriate child jobs.

A print process 420 manages the files from printing to dispatching. At a print step of the print process 420, the files are managed via the ADF to the various production print equipment. The print process may provide reprinting, forward space and back space controls, and print range functions.

After the printing process is complete, the ADF may perform a quality check process 422 and a production control process 430. After these processes are completed, the work may be assigned to inserters or finishing equipment. In processes 440 and 450 the control files are loaded to control the insert devices during mail piece processing such that the bin firing selection and timing is controlled. The insertion results are also loaded in processes 440 and 450. The insertion results may be returned in real time.

The results are then loaded back into the ADF for additional processing and manual mail piece correction or selection for reprinting at a Verification process 460. A dispatch process 470 is used to conclude the work in the ADF and indicate that the jobs are leaving the facility for delivery. A Retention process 480 may also be provided for retention.

Figure 5:
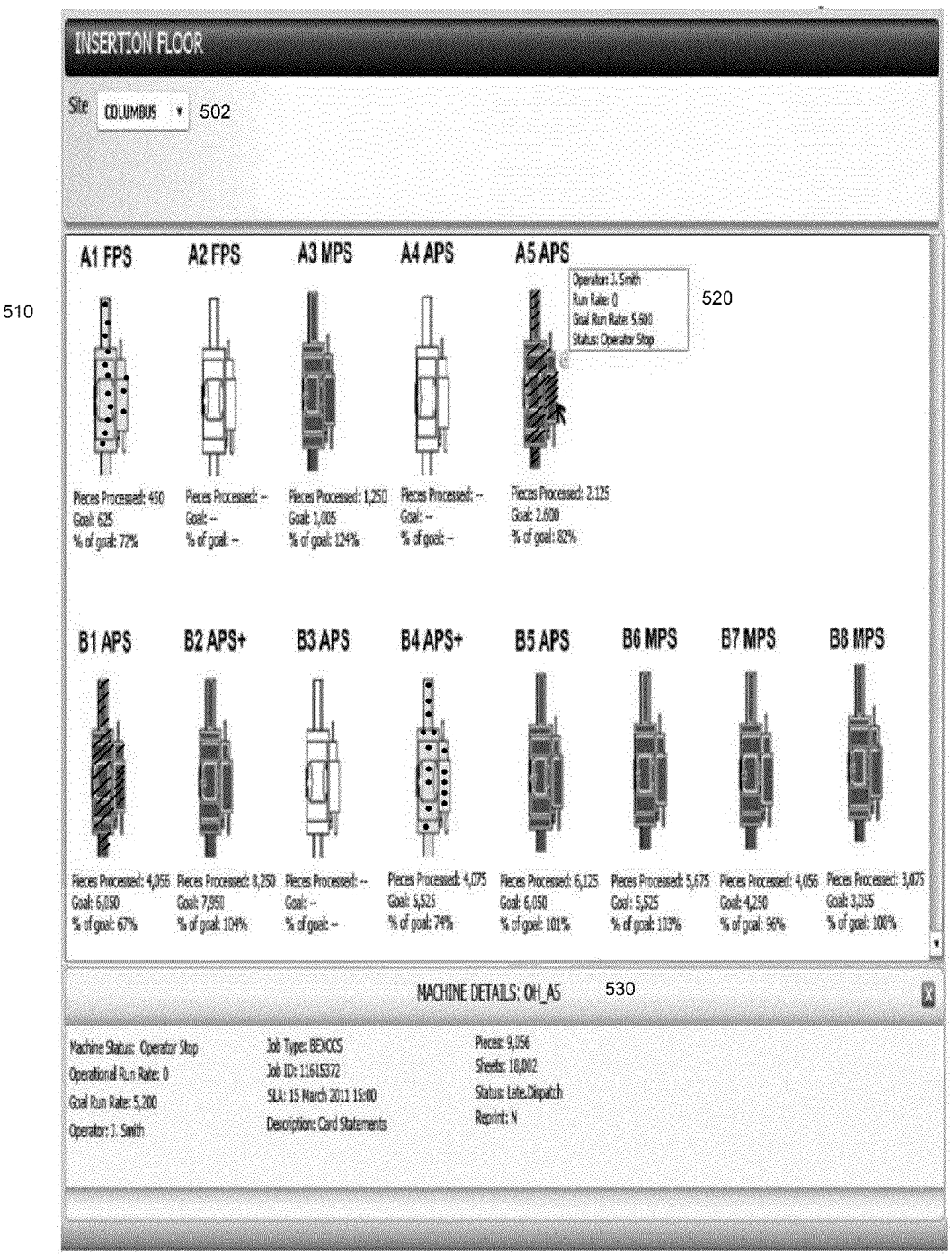
FIG. 5 is a user interface enabled by an inserter productivity monitoring and control system in accordance with an embodiment of the invention.

FIG. 5 is a user interface enabled by an inserter productivity monitoring and control system in accordance with an embodiment of the invention. User interface 500 may include a selectable site 502 and a description of each piece of inserter equipment 510. The user interface 500 may further include specific machine details at 530. The status of each inserter equipment piece may be communicated by depicting each equipment piece status with a distinct graphic representation. For example, diagonal cross-hatching, or a red colored display may indicate that a process has stopped as shown for AF APS and for B1 APS. Dotted icons A1 FPS and B4 APS+ may designate processes that are partially complete. In embodiments of the invention, yellow may be used to illustrate partial completion. Darkened icons A3 MPS, B2 APS+, B5APS, B6MPS, B7 MPS, and B8MPS may be used to represent processes that are completed or nearing completion. In embodiments of the invention, these icons may be colored green. Unshaded icons A2 FPS, A4 APS, and B3 APS may illustrate processes that have not yet begun. Below each icon, the number of pieces processed, the goal, and the percentage of the goal reached are listed. Highlighting an icon may cause more information, such as that at 520 to be displayed. At 520, the viewer obtains the identity of the operator, the run rate, the goal run rate, and the status. In this instance, the operator has stopped the processing.

Further information is also shown in section 530, which shows the basic information including machine status, operation run rate, goal run rate, and operator identity. Additional information may include job information such as job type and job ID, a description of what is being printed, the number of pieces, the number of sheets, and the current status.

FIGS. 6-13 are further descriptive of the types of information that may be displayed to system users and the manner in which the information may be displayed to enhance the user experience. The screens on pages 1-3 may be displayed on any type of computing device including a mobile device, and the system may be configured to provide alerts and real time data directly to a user device.

Figure 6:
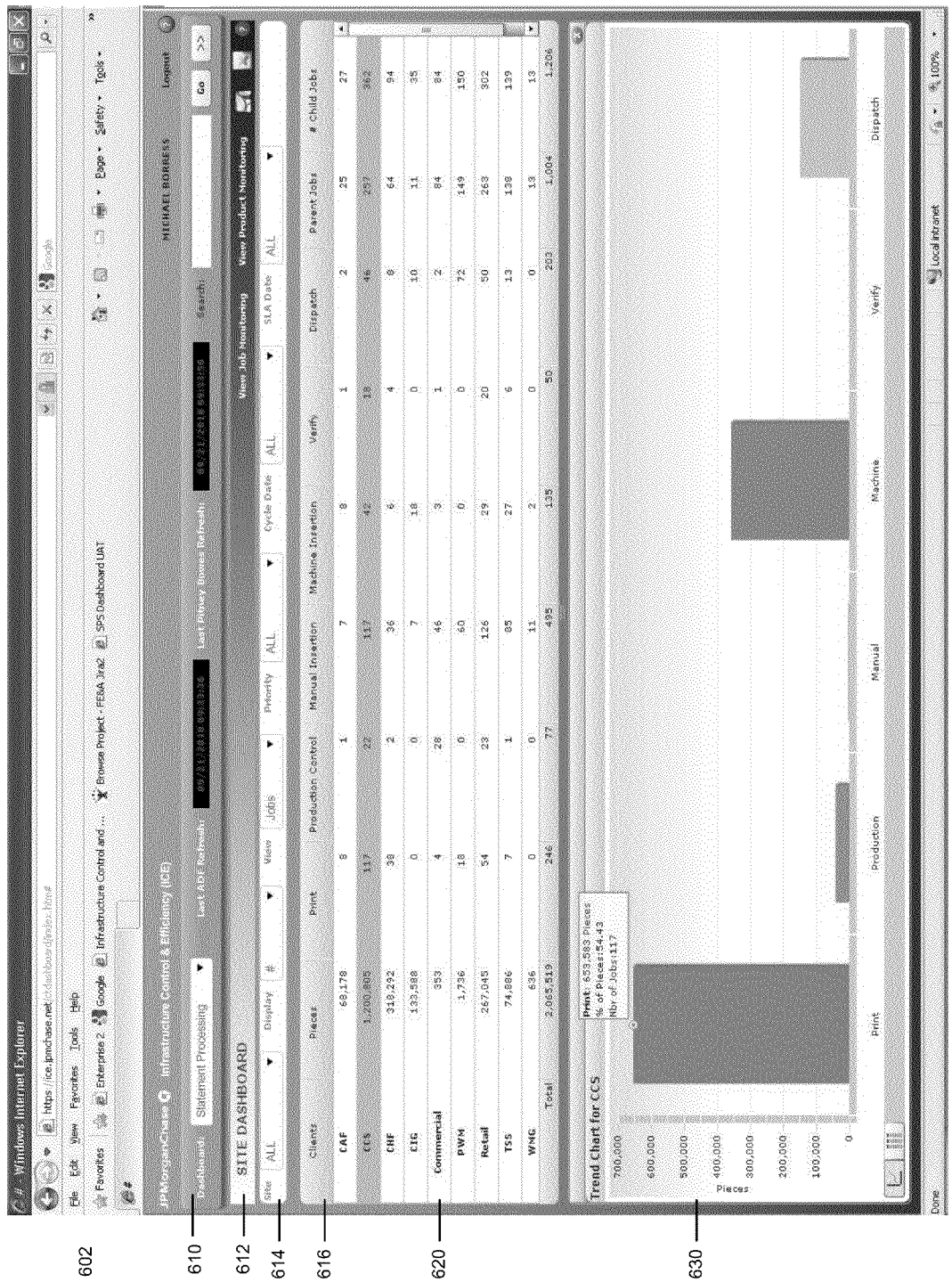
FIG. 6 is a user interface illustrating a site view within a statement processing dashboard in accordance with an embodiment of the invention.

FIG. 6 is a user interface 602 illustrating a site view 612 within a statement processing dashboard 610 in accordance with an embodiment of the invention. In embodiments of the invention, the system may print statements for mailing, the statements issued by a financial institution or other organization. Selectable display options 614 include site, display, view, priority, cycle date, and service level agreement (SLA) date. Information displayed relates to clients, pieces, print, production control, manual insertion, machine insertion, verification, dispatch, parent jobs, and child jobs. The clients may include internal clients within a business or clients external to a printing operation. The number of pieces for printing may be shown for each client. Each successive column illustrates the number of pieces currently in each process described above in the ADF with respect to FIG. 4. Additionally, the final columns show the number of parent jobs and the number of child jobs being processed. Section 630 includes a bar graph showing processing trends indicating how many pieces are in any given process at a point in time.

Figure 7:
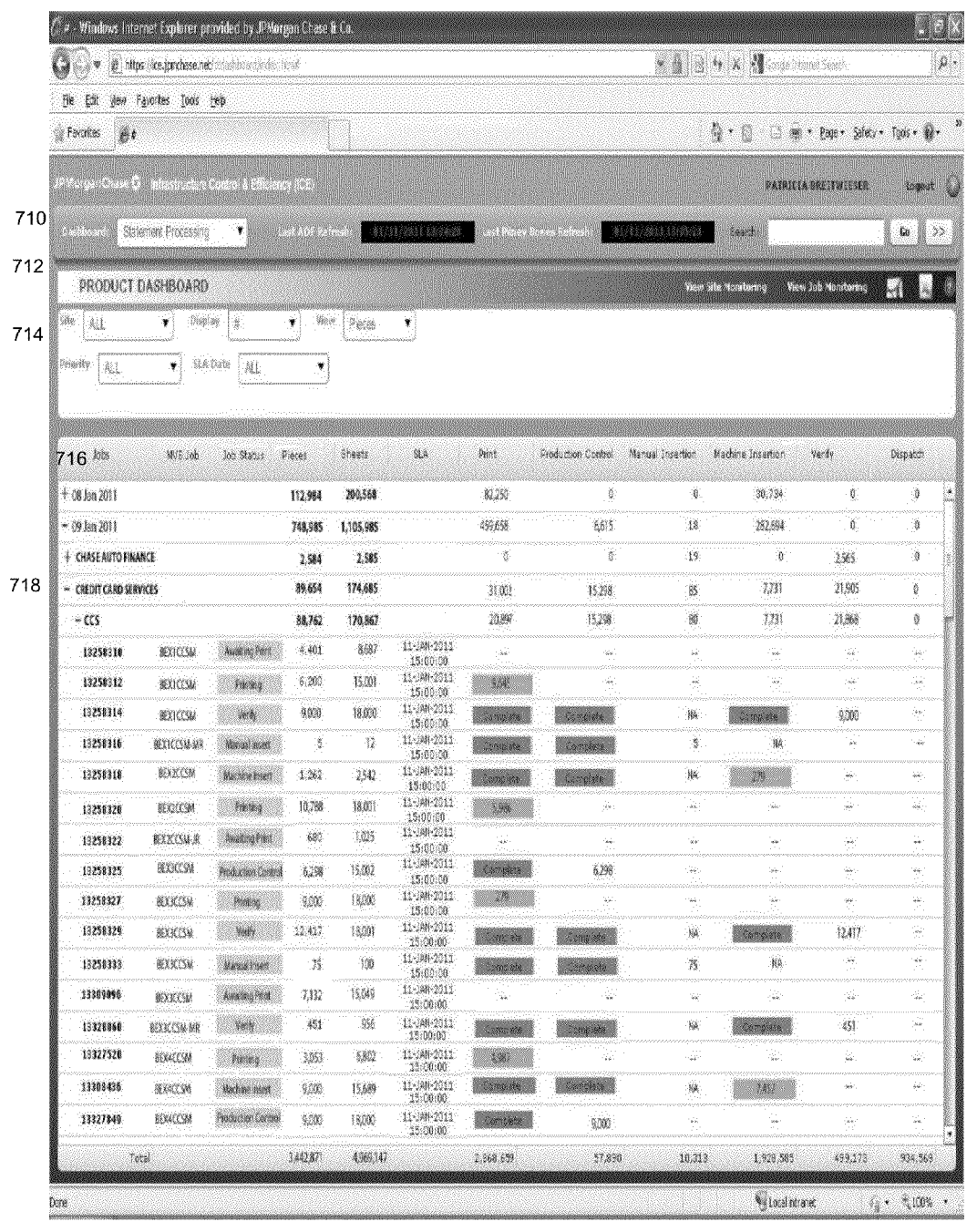

FIG. 7 is a user interface illustrating a product view 712 within a statement processing dashboard 710 in accordance with an embodiment of the invention. Section 714 includes selectable display items, such as site, display view, priority, and SLA date. Headings 716 include jobs, job identifiers, job status, pieces, sheets, and SLA. Furthermore, each successive column, including print, production control, manual insertion, machine insertion, verification, and dispatch illustrates the number of pieces currently in each process described above in the ADF with respect to FIG. 4. Section 718 provides all of the relevant data for the selected product.

Figure 8:
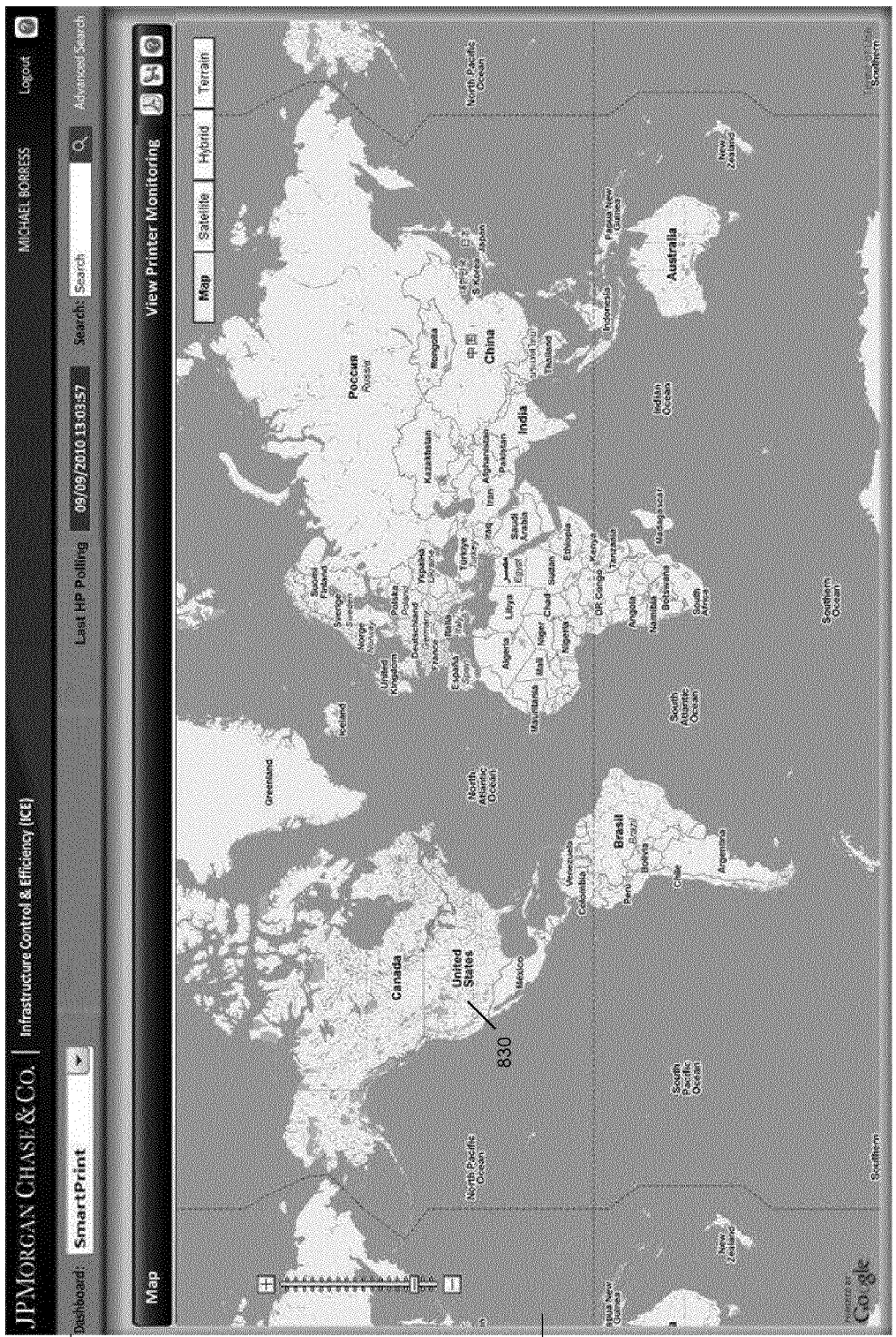
FIG. 8 is a user interface illustrating a map view within a print dashboard in accordance with an embodiment of the invention.

FIG. 8 is a user interface illustrating a map view 820 within a print dashboard 810 in accordance with an embodiment of the invention. The map 820 may cover an entire geographic area where print facilities are dispersed. Within each geographic area, a plurality of dots or other indicators may represent print facilities.

Figure 9:
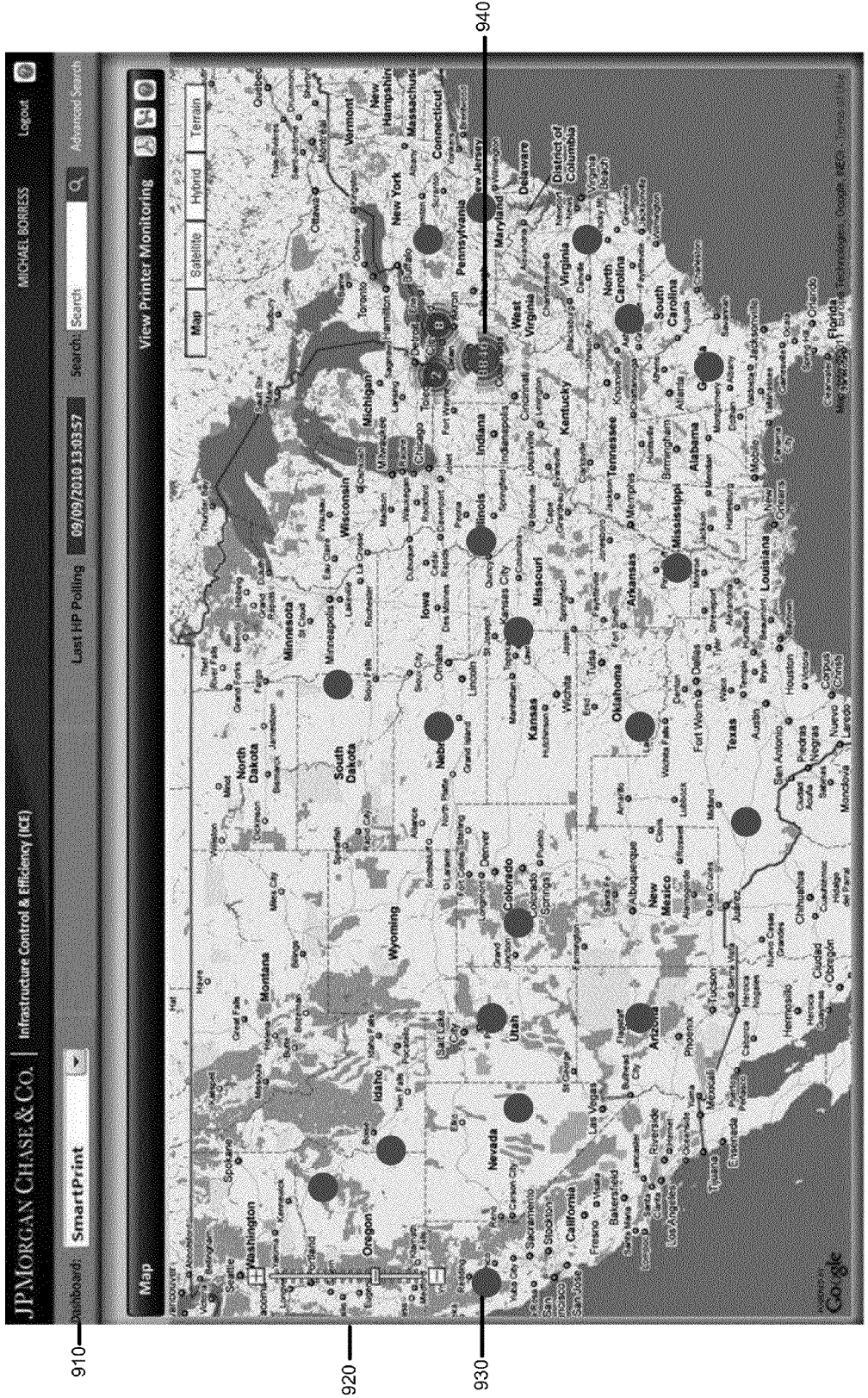
FIG. 9 is a user interface illustrating an additional map view within a print dashboard in accordance with an embodiment of the invention.

FIG. 9 is a user interface illustrating an additional map view 920 within a print dashboard 910 in accordance with an embodiment of the invention. Indicators such as dots 930 may be provided to identify print facilities. In FIG. 9, a user has zoomed in to see details as illustrated by dots 940. The dots in the region 940 illustrate a number of printers at the location. If a user clicks on the location, the user will be taken directly to a print monitoring view (shown and further described in FIG. 11) for that location.

Figure 10:
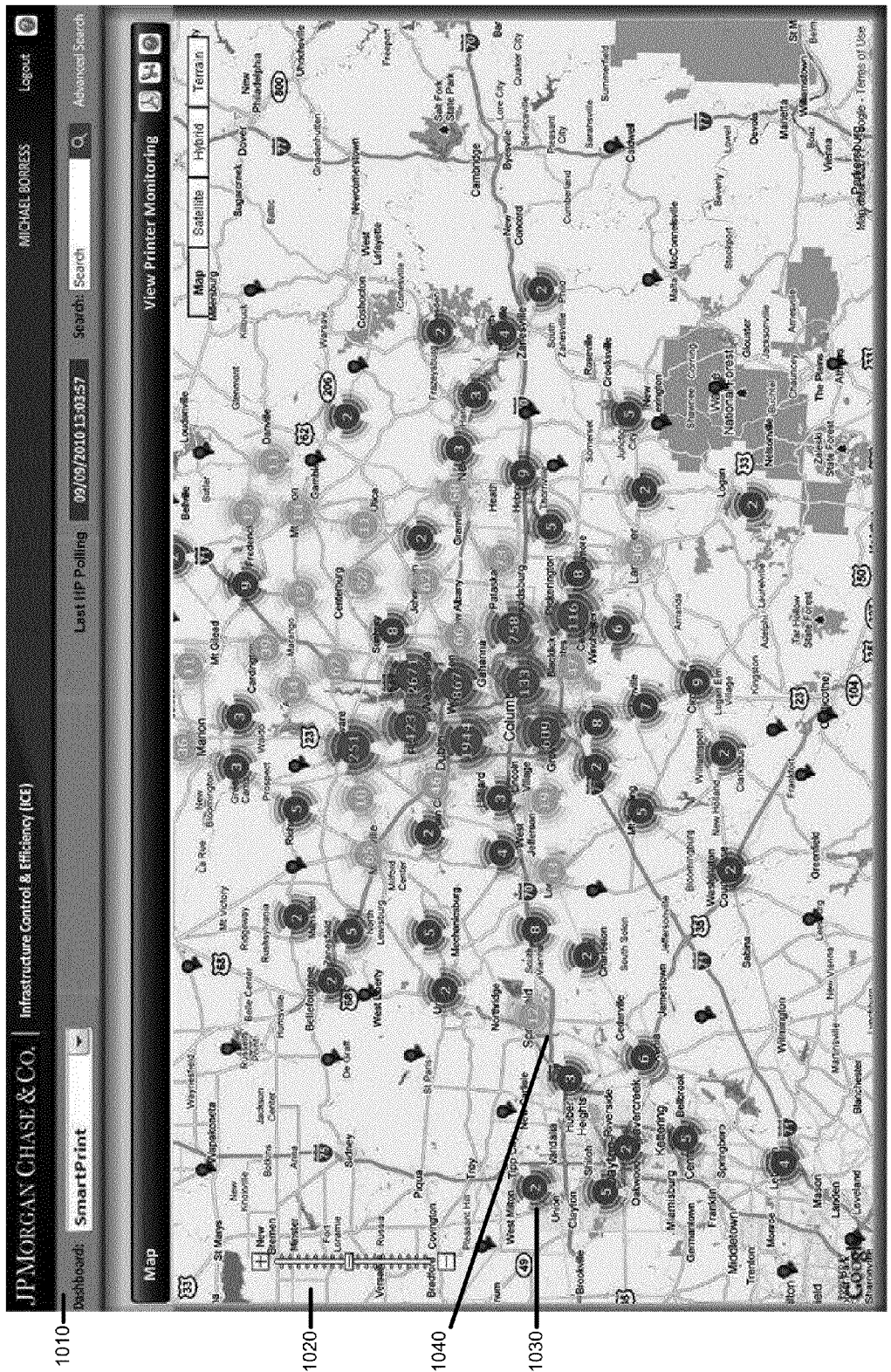
FIG. 10 is a user interface illustrating a more detailed map view in accordance with an embodiment of the invention.

FIG. 10 is a user interface illustrating a more detailed map view 1020 in accordance with an embodiment of the invention. An informational area 1010 shows the dashboard and a pooling timestamp. The polling timestamp reflects the last time the dashboard was updated with print data. The updates generally include print volume and alerts such as status and toner level. A search function in the tool bar 1010 allows the user to locate a specific printer. Search fields may include, but should not be limited to, printer name, serial number, physical location, and IP address. Highlighted dots 1030 and faded dots such as 1040 may be implemented for display on the user interfaces.

Figure 11:
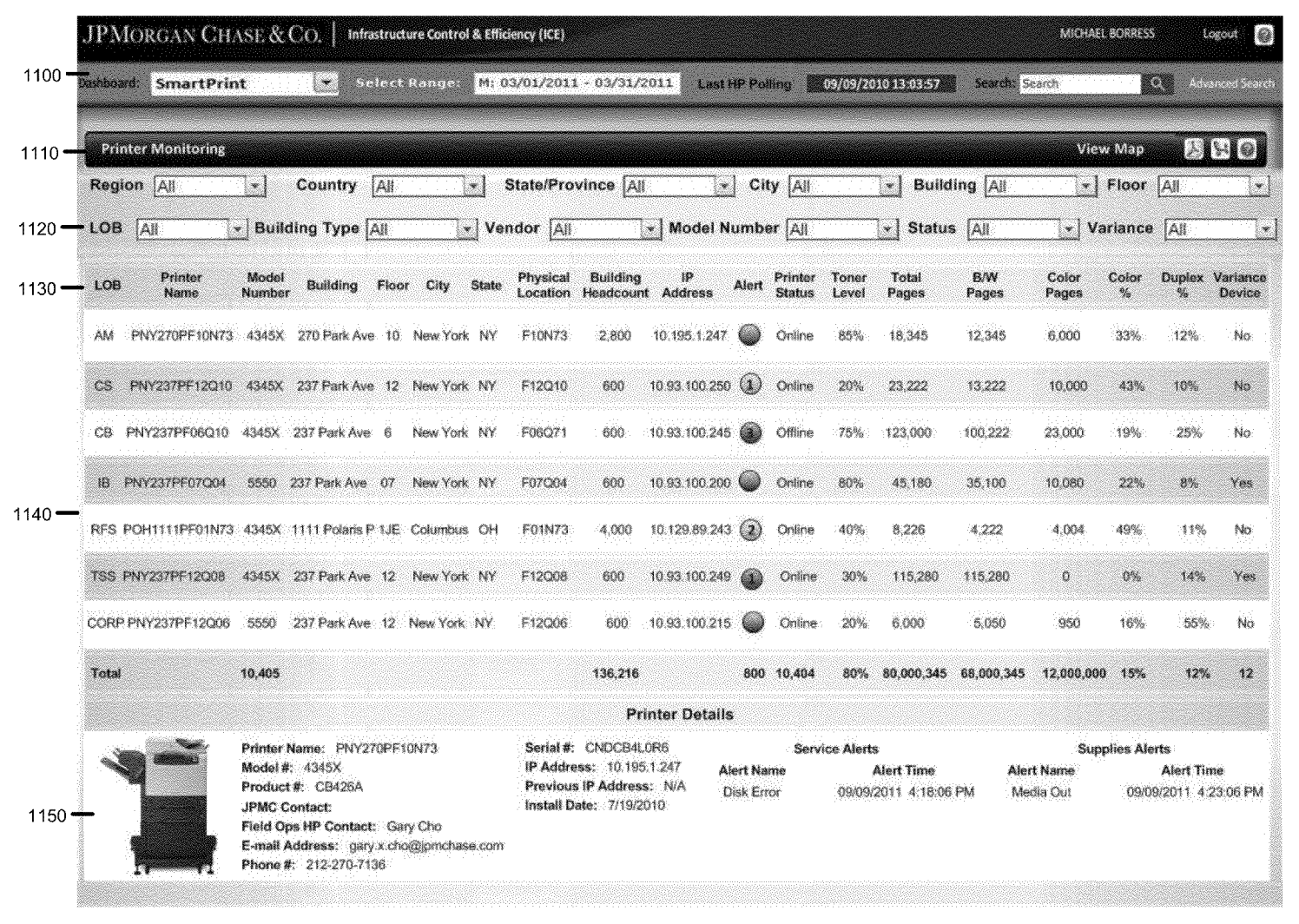

FIG. 11 is a user interface illustrating a printer monitoring view 1110 within a print dashboard in accordance with an embodiment of the invention. A toolbar 1100 includes dashboard information, polling information and a search block as described above and additionally includes a date range selector. The date range selector in the printer monitoring view updates information including pages, black and white pages, color pages, color percentage, and duplex percentage for each printer based on the date range selected. Selectable options 1120 include location information such as region, country, state/province, city, building, and floor. Selectable options 1120 may further include line of business, building type, vendor, model number, status, and variance. Columns 1130 list the information in accordance with the selected options for each printer 1140 listed. Additionally, the columns 1130 may include additional information such information on alerts, printer status, toner level, and pages. Each column may be removed or added in accordance with user preferences. Specific preferences can be saved to a default view within a user profile. A printer information area 1150 allows details for a selected printer to be specified in greater detail.

Figure 12:
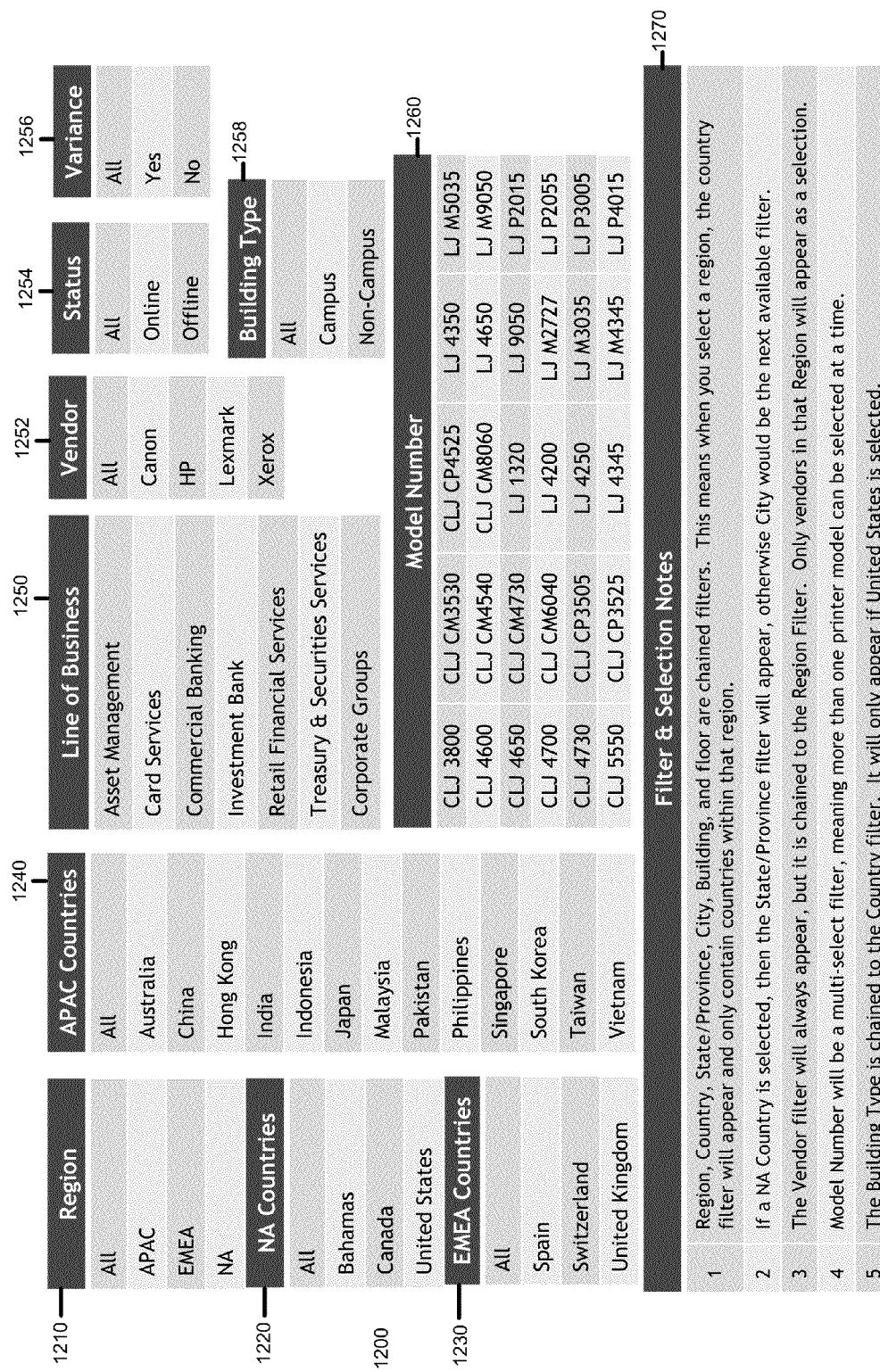
FIG. 12 is a chart illustrating information available through user interfaces in accordance with an embodiment of the invention.

FIG. 12 is a chart illustrating information available through user interfaces in accordance with an embodiment of the invention. Available regions 1210 may include selected regions or all regions. Similarly, available countries 1220, 1230, and 1240 may include all countries within a region or selected countries within a region. Lines of business 1250 are listed as lines of business within a financial institution. Vendors 1252 may include all vendors of printers within the system or selected vendors. Status indicators 1254 include all statuses, online, or offline. Illustrated building types 1258 include all building types, campus, or non-campus building types. Variance selections 1256 may include "all", "yes" or "no". Model numbers 1260 may include each model number available individually or alternatively, all model numbers may be included. Model numbers may be set as a multi-select filter, such that more than one printer model can be selected at a time. Guidance for selecting filters is illustrated at 1270. The filters may be intertwined, such that selection of a particular filter, such as "region" will limit the filters available for "country". Other filter selections may also be limited based on the selection of another filter. For example, certain building types or certain printer models may exist only in certain regions or certain countries.

FIG. 13 is a chart illustrating alerts available through user interfaces in accordance with an embodiment of the invention. Supplies alerts 1310 illustrate supply deficiencies at a selected site. Advisory alerts 1320, service errors 1330, media path alerts 1340, and service alerts 1350 illustrate particular problems that must be solved in order to resume printing. Particular types of alerts may be identified by a particular icon as illustrated in the printer monitoring screen of FIG. 11. The icons may be differentiated by color, number, shape, and/or a combination of these.

All of the components illustrated in the aforementioned drawings may be, include, or be implemented by a computer or multiple computers. The components may be described in the general context of computer-executable instructions, such as program modules, being executed by a computer. Generally, program modules include routines, programs, objects, components, data structures, etc. that perform particular tasks or implement particular abstract data types.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, at least one set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A computer-implemented control and monitoring system for facilitating print job management and monitoring multiple geographically dispersed printers, the multiple geographically dispersed printers being located at more than one distinct street address, the system monitoring at least one print server and at least one insertion device for inserting printed material into envelopes, the system comprising:

a print data collection processor communicating with the at least one print server, the print data collection processor implementing a data collection process for collecting print status data;

insertion data collection processing components communicating with the at least one insertion device for collecting insertion status data;

data integration components for automatically integrating the collected insertion status data with the collected print status data; and a user application including multiple user interfaces for displaying the integrated print status data and insertion status data in an interactive format, the user interfaces including the following:

a printer map view capable of displaying a location marker for each geographic location of the multiple geographically dispersed printers located at more than one distinct street address; and a statement processing dashboard having multiple selectable views, the views including at least a job monitoring view, a product monitoring view, and a site monitoring view;

wherein each location marker is selectable and selection of a location marker generates a printer monitoring view for printers in the selected location.

2. The system of claim 1, wherein the printer map view provides a search function for locating a specific printer, wherein each printer can be searched by printer name, serial number, location, and IP address.

3. The system of claim 1, wherein the printer monitoring view produces printer information including at least printer identifying information, location information, printer status, pages printed, and alert status.

4. The system of claim 3, wherein the alert status includes one of supply alerts, advisory alerts, service errors, media path alerts, and service alerts.

5. The system of claim 1, wherein the product monitoring view shows completion status of both print and insertion processes for a selected product.

6. The system of claim 1, wherein the user interface includes an insertion floor status interface, wherein each insertion floor is viewable upon site selection.

7. The system of claim 6, wherein the insertion floor user interface provides a completion status of each inserter.

8. The system of claim 1, the system additionally including at least one image capturing device interfacing with the insertion data processor for capturing device real time images of the insertion process in a given location.

9. A computer-implemented control and monitoring method for print shop management, the method monitoring at least one print server and at least one insertion device for inserting printed material into envelopes, the method comprising:

implementing programmed computer processing components for performing steps including, communicating with the at least one print server for collecting print status data;

communicating with the at least one insertion device for collecting insertion status data;

automatically integrating the collected insertion status data with the collected print status data;

providing a user application including multiple user interfaces for displaying the integrated print status data and insertion status data in an interactive format;

monitoring multiple geographically dispersed printers and providing a printer map view, wherein at least two of the multiple geographically dispersed printers are located at more than one distinct street address;

displaying a location marker for each geographic location of the multiple geographically dispersed printers;

providing a statement processing dashboard having multiple selectable views, the views including at least a job monitoring view, a product monitoring view, and a site monitoring view; and generating selectable location markers, wherein selection of a location marker generates a printer monitoring view for printers in the selected location.

10. The method of claim 9, further comprising providing a search function on the printer map view for locating a specific printer, wherein each printer can be searched by printer name, serial number, location, and IP address.

11. The method of claim 9, further comprising producing printer information in the printer monitoring view, wherein the printer information includes at least printer identifying information, location information, printer status, pages printed, and alert status.

12. The method of claim 11, further comprising providing the alert status including one of supply alerts, advisory alerts, service errors, media path alerts, and service alerts.

13. The method of claim 9, wherein the product monitoring view shows completion status of both print and insertion processes for the selected product.

14. The method of claim 13, further comprising providing an insertion floor status interface, wherein each insertion floor is viewable upon site selection.

15. The method of claim 14, wherein the insertion floor user interface provides a completion status of each inserter.

16. The method of claim 15, further comprising implementing an at least one image capturing device interfacing with the insertion data processor for capturing real time images of the insertion process in a given location.

17. A computer-implemented control and monitoring method for print shop management, the method monitoring multiple print servers and insertion devices for inserting printed material into envelopes, the method comprising:

implementing programmed computer processing components for performing steps including, receiving print status data and insertion status data from the multiple printing and insertion sites;

matching the print data with the insertion data for each submitted print job and integrating the print status data with the insertion status data;

providing a user application including multiple user interfaces displaying the integrated print status data and insertion status data in an interactive format;

displaying a location marker at two or more distinct street addresses for each geographic location of the multiple geographically dispersed printers;

selecting at least one location marker; and generating, in response to the selection of the at least one location marker, a printer monitoring view and a site monitoring view for printers in the selected location.

* * * * *